US011919030B2

(12) United States Patent
Leitch et al.

(10) Patent No.: US 11,919,030 B2
(45) Date of Patent: Mar. 5, 2024

(54) HIGH SPEED SEALANT STRIP APPLICATION

(71) Applicant: Building Materials Investment Corporation, Dallas, TX (US)

(72) Inventors: Olan T. Leitch, Mt. Juliet, TN (US); Timothy A. Machelski, Flower Mound, TX (US)

(73) Assignee: BMIC LLC, Dallas, TX (US)

( * ) Notice: Subject to any disclaimer, the term of this patent is extended or adjusted under 35 U.S.C. 154(b) by 331 days.

(21) Appl. No.: 17/091,467

(22) Filed: Nov. 6, 2020

(65) Prior Publication Data

US 2021/0053088 A1 Feb. 25, 2021

Related U.S. Application Data

(63) Continuation of application No. 15/968,259, filed on May 1, 2018, now Pat. No. 10,835,916.

(Continued)

(51) Int. Cl.
*B05D 1/28* (2006.01)
*B05C 1/08* (2006.01)
(Continued)

(52) U.S. Cl.
CPC .............. *B05C 1/16* (2013.01); *B05C 1/0808* (2013.01); *B05C 1/0813* (2013.01);
(Continued)

(58) Field of Classification Search
CPC .... B05D 1/28; B05D 5/10; B05C 1/16; E04D 2001/3435
See application file for complete search history.

(56) References Cited

U.S. PATENT DOCUMENTS 3,239,992 A 3/1966 Hodgson
4,923,913 A 5/1990 Chich et al.
(Continued)

FOREIGN PATENT DOCUMENTS

CA 2057461 7/2004

*Primary Examiner* — Nathan H Empie
(74) *Attorney, Agent, or Firm* — Womble Bond Dickinson (US) LLP

(57) ABSTRACT

An applicator is disclosed for applying sealant to a moving substrate. The applicator includes a wheel having a periphery. A plurality of spaced apart footprints extends around the periphery of the wheel and each footprint has a sealant receiving feature. A reservoir is provided for containing a supply of sealant to be applied to the moving substrate. The wheel is rotatably mounted at least partially in the reservoir such that as the wheel rotates, each of the spaced apart footprints repeatedly moves through a supply of sealant in the reservoir to pick up a charge of sealant, around one side of the wheel toward the moving substrate, adjacent the moving substrate to transfer the sealant charge to the substrate, and around the other side of the wheel back toward the supply of sealant. At least one stop is formed on each of the footprints for inhibiting sealant picked up by the footprint from being urged rearwardly on the footprint by high speed rotation of the wheel. A backstop may be formed at a trailing end of each footprint and mid-stops may be formed between a leading end of each footprint and the trailing end.

21 Claims, 4 Drawing Sheets

Related U.S. Application Data

(60) Provisional application No. 62/503,056, filed on May 8, 2017.

(51) Int. Cl.

| | |
|---|---|
| ***B05C 1/16*** | (2006.01) |
| ***B05C 11/04*** | (2006.01) |
| ***B05C 11/11*** | (2006.01) |
| ***B05D 5/10*** | (2006.01) |
| *E04D 1/34* | (2006.01) |

(52) U.S. Cl.

CPC ............. *B05C 11/041* (2013.01); *B05C 11/11* (2013.01); *B05D 1/28* (2013.01); *B05D 5/10* (2013.01); *B05D 2252/02* (2013.01); *E04D 2001/3435* (2013.01)

(56) References Cited

U.S. PATENT DOCUMENTS

| | | | | |
|---|---|---|---|---|
| 5,239,802 | A | 8/1993 | Robinson | |
| 6,030,475 | A | 2/2000 | Spotts | |
| 6,044,608 | A | 4/2000 | Stahl et al. | |
| 6,467,235 | B2 | 10/2002 | Kalkanoglu et al. | |
| 6,544,374 | B2 | 4/2003 | King et al. | |
| 6,968,662 | B2 | 11/2005 | Rodrigues | |
| 7,204,063 | B2 | 4/2007 | Kandalgaonkar | |
| 8,266,861 | B2 | 9/2012 | Koch et al. | |
| 9,795,981 | B2 | 10/2017 | Svec | |
| 2004/0237462 | A1 * | 12/2004 | Collins | E04D 5/12 52/749.12 |
| 2018/0318867 | A1 | 11/2018 | Leitch et al. | |

* cited by examiner

HIGH SPEED SEALANT STRIP APPLICATION

REFERENCE TO RELATED APPLICATIONS

The present Patent Application is a continuation of previously filed, co-pending U.S. patent application Ser. No. 15/968,259 filed May 1, 2018, and claims the benefit of U.S. provisional patent application 62/503,056 filed on May 8, 2017.

INCORPORATION BY REFERENCE

U.S. patent application Ser. No. 15/968,259 filed on May 1, 2018, and U.S. Provisional Patent Application No. 62/503,056, filed on May 8, 2017, are specifically incorporated by reference herein as if set for in their entireties.

TECHNICAL FIELD

This disclosure relates generally to asphalt shingle manufacturing and more specifically to devices and methods for applying a self-seal or sealant strip to shingles during the manufacturing process.

BACKGROUND

Modern asphalt roofing shingles generally are formed from asphalt saturated and coated fibrous webs covered on an upper side with protective ceramic granules. Each shingle includes an upper headlap portion and a lower portion that is exposed on a roof. The headlap portion is designed to be overlapped by the lower portions of a next higher course of shingles when the shingles are installed. The lower portion often is separated by slots into individual tabs of the shingle, which are exposed on a roof after installation. Other shingle configurations also exist. For example, higher end roofing shingles may comprise two laminated plies of shingle material adhered together with at least the top ply being cut into tabs commonly known as "dragon teeth" to lend texture and the appearance of thickness to a shingle installation.

Regardless of the style of asphalt shingle, raising and consequent tearing of exposed shingle tabs during high wind conditions can result in rainwater leakage and ultimate failure of a shingle system. It therefore is highly desirable and even necessary that the exposed portions of asphalt shingles be adhered to the headlap portion of underlying shingles to minimize the rising or lifting of the exposed portions caused by high winds. This is commonly accomplished for simple strip or tab shingles by the application of a sealant strip to the headlap portions on the front sides of shingles just above the lower exposed portions. For architectural laminate shingles, sealant typically is applied to the lower back side of each shingle. Other configurations and placements are possible.

The sealant strips soften between courses of shingles when shingles are heated by the sun to bond the overlapping exposed portions of one course of shingles to the headlap portions of shingles in a next lower course. Such strips often referred to as "self-seal strips" usually are applied in a discontinuous line defined by short dashes of sealant separated by short spaces that contain no sealant. The spaces are important because they allow moisture that may penetrate or condense between overlapping shingles to drain through the spaces between the bonded dashes of the strip. Discontinuous strips also reduce the amount of sealant needed.

In the past, self-seal strips have been applied during the manufacturing process by moving a web of shingle stock over a rotating self-seal applicator wheel that contacts or passes closely adjacent the shingle stock to apply the sealant. The applicator wheel has a peripheral surface that in one embodiment is defined by a plurality of lands often called "footprints" separated by gaps. In operation, the wheel is rotated about its horizontal axis with a surface speed that may be substantially the same as the line speed at which the shingle stock is moving above. Alternatively, the wheel may be rotated at a rate such that its surface speed is different from the line speed to obtain a preferred result. The peripheral surface of the wheel passes downwardly through an underlying reservoir carrying liquid sealant and, in turn, picks up sealant on its footprints. The loaded footprints then rotate upwardly to contact the moving web of shingle stock and the sealant on the footprints is transferred to the shingle stock. Because the footprints are spaced apart by gaps, this produces intermittent dashes of sealant separated by spaces extending along the shingle stock, which together define the self-seal strip.

While the above technique for applying a self-seal strip has proven adequate at lower line speeds commonly used in the past, it has been found to be inadequate at higher line speeds. This is at least in part because, at such higher speeds, the applicator wheel must be rotated at higher rotation rates for its surface speed to match or approximate or be some multiple of the speed at which the shingle stock is moving above. Under high speed operating conditions, sealant picked up by the footprints of the applicator wheel in the reservoir tends to slide rearwardly and at least partially off of the trailing ends of the footprints as it is carried up and around to be applied to the shingle stock. This can also be a problem for manufacturing plants with smaller diameter applicator wheels since smaller wheels must operate at higher revolutions per minute (rpm) than larger wheels.

Ever higher line speeds in shingle manufacturing are desirable because they increase production rates. However, because of the above noted problems, the quality of applied self-seal strips degrades as line speed increases. It has been found, for example, that the dashes of a self-seal strip applied at higher line speeds become inconsistent. Because the sealant has slid or shifted toward the trailing edges and some has slipped off the trailing edges of the footprints as the footprints are moved up from the reservoir, the dashes of sealant can be overly thick at one end and overly thin at the other. Sealant that may slide off of the trailing ends of the footprints also can result in "bridging" between dashes of sealant. This can compromise the moisture draining function of the spaces between the dashes and even result in shingles that must be rejected as not meeting quality standards.

A need exists for a method and apparatus that can apply self-seal strips to moving shingle stock webs at higher line speeds without compromising the quality of the dashes of the strip or causing stringing and bridging between dashes. It is to the provision of such a method and apparatus that the present invention is primarily directed.

SUMMARY

Briefly described, a sealant strip applicator comprises an applicator wheel rotatable about a horizontal axis below (or above) a moving web of shingle stock. The peripheral surface of the applicator wheel is formed with a plurality of footprints separated by gaps between the footprints. Each footprint is characterized by outwardly projecting side walls that bound and partially define a depressed area, which may take the form of a groove, extending along the surface of the footprint. As the peripheral surface of the applicator wheel rotates down through the sealant in the reservoir, sealant is picked up by the footprints, especially within the groove defined between the side walls of each footprint. The sealant is carried upwardly with the footprints until the footprints engage the surface of moving shingle stock above, whereupon the sealant is transferred from the grooves of the footprints to the shingle stock, forming the sealant dashes separated by gaps characteristic of a self-seal strip.

According to the invention, a backstop in the form of an upstanding end wall is formed on each footprint spanning across the spanning across the groove at the trailing end of the footprint. Further, one or more mid-stops may be formed in each footprint and may take the form of upstanding walls spanning the groove of each footprint intermediate its leading end and its trailing end. The backstops intercept sealant that might otherwise tend to slide rearwardly off the trailing ends of the footprints thus keeping the sealant within the groove. The mid-stops retain the sealant in the mid-portions of the grooves so that it does not tend to pile up or bunch up at the trailing ends of the grooves. As a result, the sealant is held in the grooves of the footprints and is prevented from moving reawardly and sliding off the trailing ends of the footprints, even at high line speeds. As a consequence, the sealant dashes applied to the shingle stock at high speeds are more fully formed, troublesome bridging between dashes is reduced or eliminated, and the self-seal strip is more consistent along its length, thereby improving performance.

Thus, a method and apparatus for applying self-seal strips to shingles is now provided that successfully addresses the problems of the prior art and results in high quality sealing strips at much higher line speeds. These and other aspects, features, and advantages of the invention will be better appreciated upon review of the detailed description presented below when taken in conjunction with the accompanying drawing figures, which are briefly described as follows.

DETAILED DESCRIPTION

Figure 1:
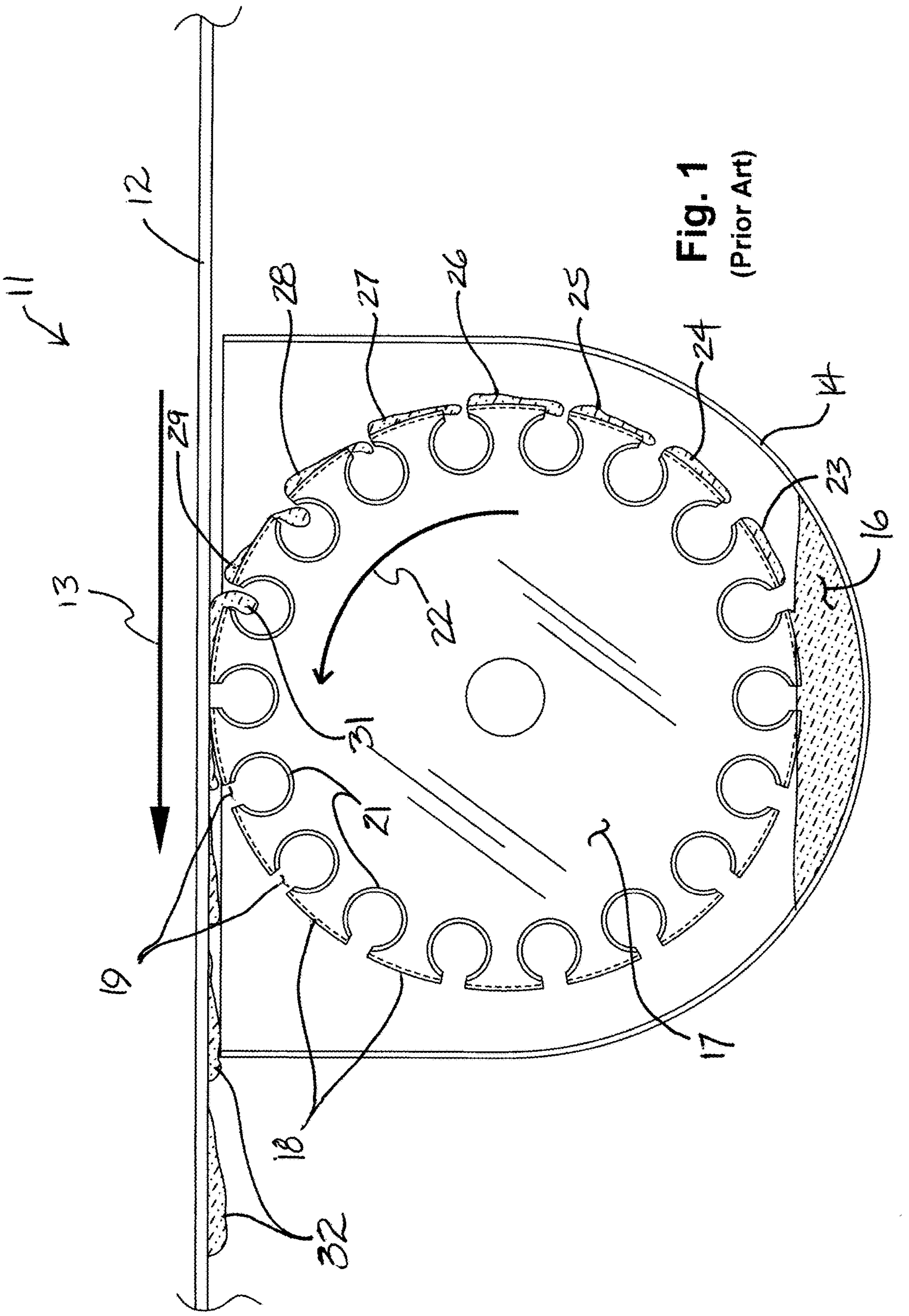
Fig. 1 (Prior Art)
FIG. 1 is a side elevation showing in simplified form a prior art sealant strip application system illustrating problems that arise with attempts to run at high line speeds.

Reference will now be made in more detail to the attached drawing figures, wherein like reference numerals indicate like parts where appropriate throughout the views. FIG. 1 is a highly simplified schematic drawing of a typical prior art sealant applicator disposed along a shingle manufacturing line and illustrates problems with the prior art at higher line speeds. The sealant applicator 11 is disposed beneath a web of shingle stock 12 that is being moved in a processing direction 13 at a predetermined line speed. In FIG. 1, the predetermined line speed is a "high" speed that is higher than a typical shingle line speed commonly used in the past, and may be significantly higher.

The sealant applicator 11 includes a reservoir 14 that contains a supply of sealant 16. The sealant may be an asphalt, and adhesive, or any other liquid material intended to be applied to the shingle stock above. An applicator wheel 17 is mounted at least partially within the reservoir for rotation about a horizontal axis that extends perpendicular to the direction 13. The applicator wheel 17 is formed with a plurality footprints 18 extending around the periphery of the applicator wheel 17. The footprints are separated by gaps 19. The gaps 19 extend inwardly to merge with cutouts 21 in the applicator wheel that function to collect and shed excess sealant that may fall through the gaps 19. The cutouts 21 may be circular, U-shaped, or otherwise shaped as desired.

A drive mechanism (not shown) is coupled to the applicator wheel and is controlled to rotate the wheel in direction 22 at a desired rate. The desired rate preferably is such that the surface speed of the footprints 18 is substantially the same as the line speed at which the shingle stock 12 moves in the processing direction 13. As the applicator wheel rotates, the footprints 18 are moved through the supply of sealant 16 in the reservoir 14 and each footprint picks up a charge of sealant (e.g. charge 23). The charges of sealant are then transported by the footprints around and up toward the moving shingle stock 12. At the top of the applicator wheel, the footprints engage the moving shingle stock and the charges of sealant carried by the footprints are transferred to the shingle stock. This, in turn, creates a strip of sealant along the shingle stock characterized by dashes of sealant separated by spaces between the dashes, i.e. a "self-seal strip."

As mentioned, FIG. 1 depicts operation of the prior art sealant applicator wheel at a high speed and illustrates problems that have been found to arise at such high speed operation with maintaining the sealant in place on the footprints. It should be understood that dimensions and configurations of sealant are exaggerated in FIG. 1 for a clearer understanding of these problems. As the applicator wheel rotates at a high rate, each footprint moves through the supply of sealant 16 and picks up a charge of sealant to be applied to the shingle stock above. Each charge is then carried around and up by its footprint until it is applied to the shingle stock. However, since the prior art applicator wheel in FIG. 1 is rotating at a high speed in this example, each charge of sealant is gradually urged rearwardly in the groove of the footprint. Some of the charge may well slide off of the trailing edge of the footprint before the footprint reaches the shingle stock.

This phenomenon is illustrated in FIG. 1. The sealant charge 23 is seen to be substantially evenly distributed along its footprint just after having been picked up from the sealant supply 16. Sealant charge 24, which was picked up slightly earlier than sealant charge 23, is being urged by the high speed rotation of the wheel 17 slightly rearwardly. Sealant charge 25 has been urged even more rearwardly and the trailing end of this charge is beginning to slide off of the trailing end of the footprint. As a consequence, the sealant charge 25 is beginning to become unevenly distributed along the footprint with relatively more sealant near the leading edge of the footprint and relatively less sealant near the trailing edge of the footprint. The phenomenon continues to worsen for the footprints that have been carried further around and up. Sealant charges 26, 27, 28, and 29 are seen to be progressively more misshaped and unevenly distributed as more sealant slides rearwardly and off the trailing edge of the footprint.

Sealant charge 31 has been carried by its footprint into contact with the moving shingle stock above and is being transferred to the shingle stock to form a sealant dash. However, because the charge 31 has become misshapen during its journey around and up, the resulting dash on the shingle stock is applied unevenly. For instance, there may be an excess of sealant at the beginning of the sealant dash and comparatively little sealant at the end of the sealant dash. This is illustrated at 32 in FIG. 1. In addition, applied sealant dashes can have ridges that extend down the length of the dash and/or bridging between dashes can occur due to the sealant trailing behind the footprints within the gaps that separate them. At higher and higher line speeds, the quality of the applied self-seal strip degrades and ultimately becomes unacceptable.

Figure 2:
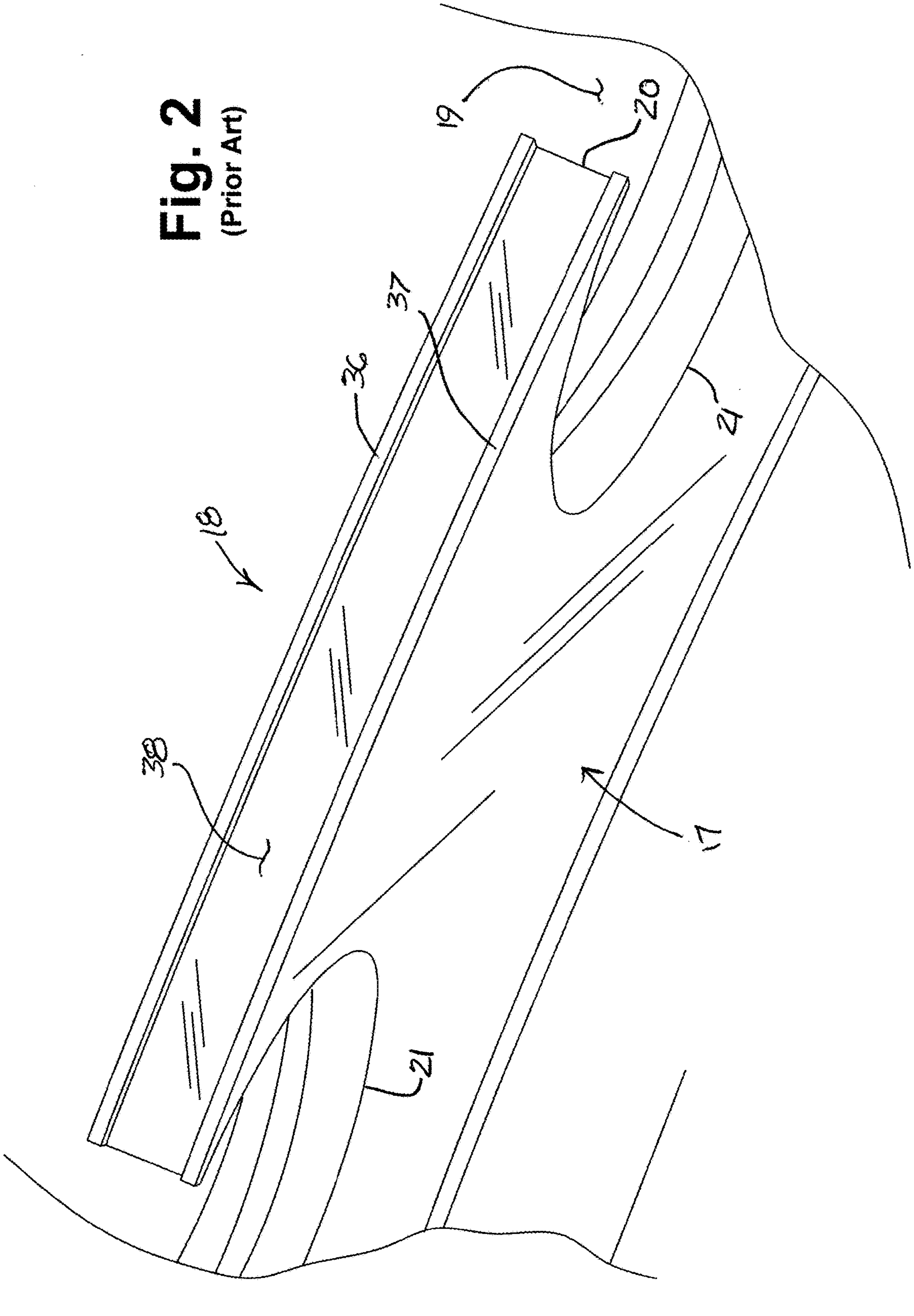
Fig. 2 (Prior Art)
FIG. 2 is a perspective view of a single footprint of a prior art sealant strip application wheel.

FIG. 2 shows the top of a typical prior art footprint found on sealant applicator wheels. The footprint 18 has a first upstanding side wall 36 and a second upstanding side wall 37 extending along the sides of the footprint. The first and second upstanding side walls define a depressed region, in this case a groove, between the walls. Sealant is picked up in the groove as the footprint moves through the sealant supply at the bottom of the reservoir. The first and second walls 36 and 37 help prevent the sealant from spilling over the sides of the footprint as it is carried around and up with the rotating applicator wheel. As mentioned above, however, high speed operation of the sealant wheel progressively urges sealant charge reawardly and some of the charge may slide off of the trailing edge 20 of the footprint.

Figure 3:
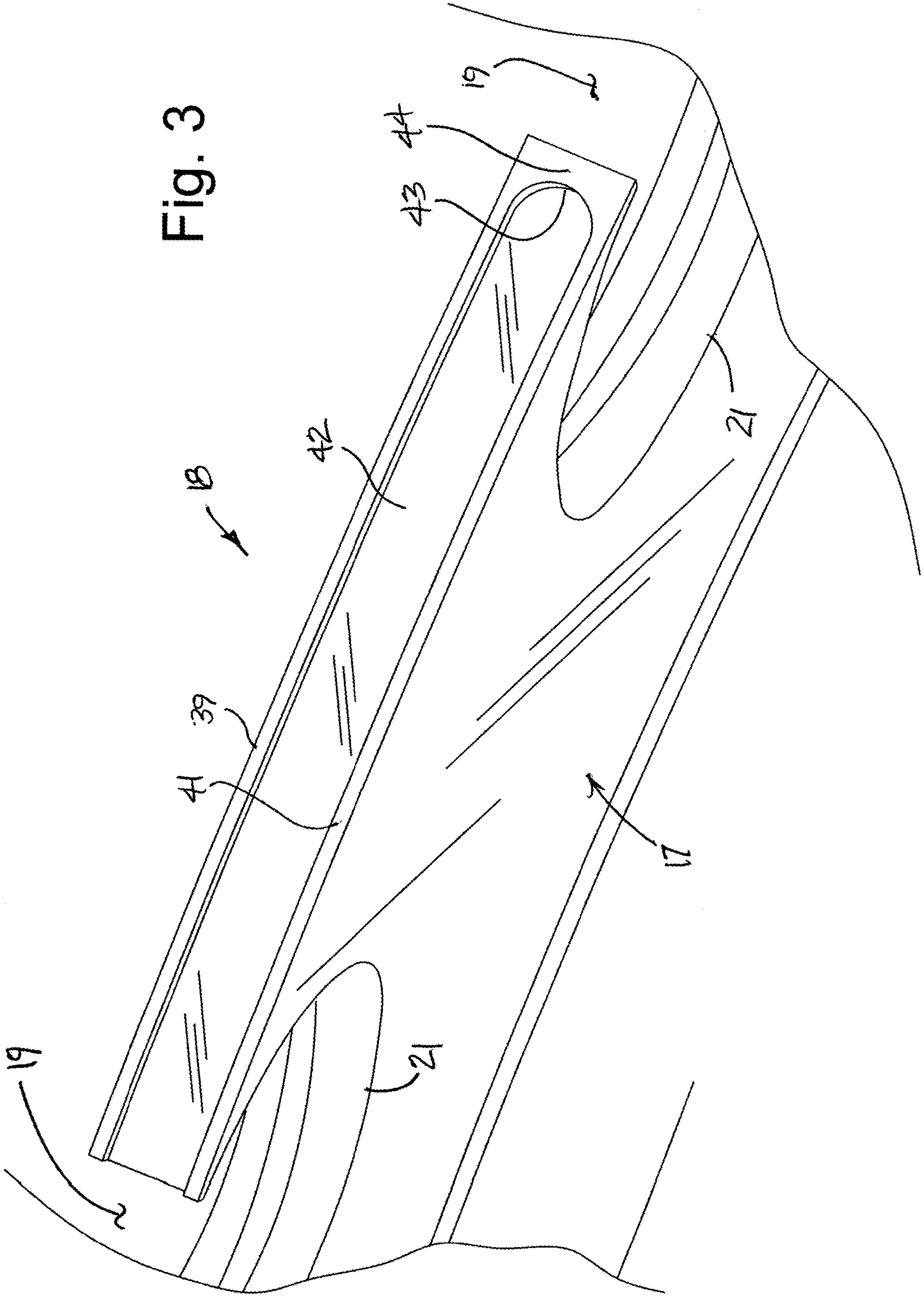
FIG. 3 is a perspective view showing one embodiment of a single footprint of a sealant strip application wheel according to principles of the invention.

FIG. 3 shows a single footprint of a sealant applicator wheel that incorporates principles of the present invention in one preferred embodiment. The footprint 18 is defined between gaps 19 on the periphery of the sealant applicator wheel. A first upstanding side wall 39 extends along one side of the footprint and a second upstanding side wall 41 extends along the opposite side of the footprint. The first and second upstanding side walls define between them a groove 42 for receiving sealant to be applied to a moving web of shingle stock. A third upstanding wall 44 spans the trailing end of the groove 42 and forms a backstop 43 at the trailing end of the groove. In the embodiment illustrated in FIG. 3, the backstop is arcuate in shape to apply sealant dashes with curved ends; however, it may just as well be straight or configured with some other shape as desired.

During operation of the sealant applicator wheel 17 at high speeds in high speed shingle manufacturing, each footprint 18 of FIG. 3 picks up a charge of sealant as previously described. As the sealant is carried around and up toward the moving shingle stock, the backstop 43 formed by the third upstanding wall 44 inhibits the sealant from sliding off the trailing end of the groove 42. This, in turn, helps to maintain a more even distribution of the sealant charge along the length of the footprint. When the footprint of FIG. 3 contacts the moving shingle stock at the top of its travel, the more evenly distributed charge of sealant is transferred to the shingle stock. This forms a dash of sealant on the shingle stock that is more consistent, more fully formed, and that exhibits better performance and more consistent performance when shingles are ultimately installed on a roof deck. Further, the entire self-seal strip applied to the shingles is more uniform and bridging between sealant dashes caused by sealant in the gaps between footprints is greatly reduced or eliminated.

Figure 4:
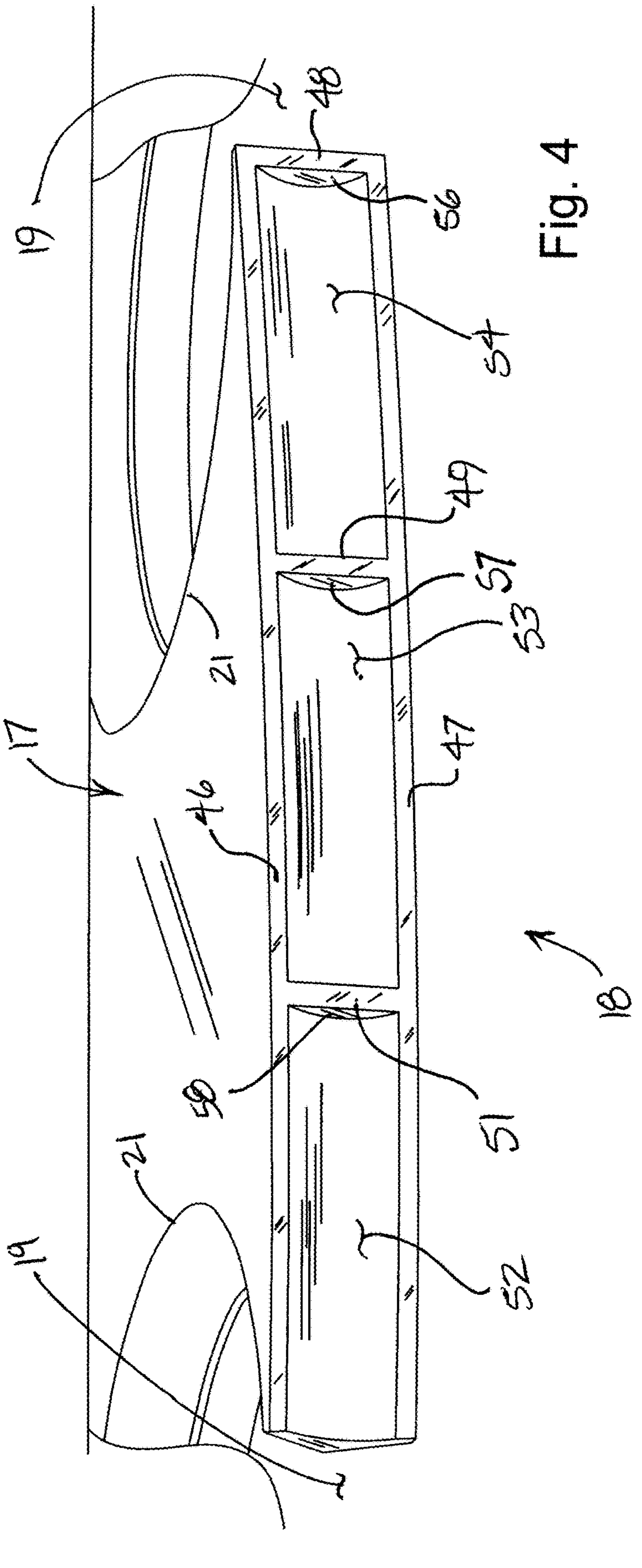
FIG. 4 is a perspective view showing an alternate embodiment of a single footprint of a sealant strip application wheel according to principles of the invention.

FIG. 4 shows a single footprint of a sealant applicator wheel 17 that incorporates principles of the present invention in an alternate preferred embodiment. The footprint 18 is defined between gaps 19 on the periphery of the sealant applicator wheel 17. A first upstanding side wall 46 extends along one side of the footprint and a second upstanding side wall 47 extends along the opposite side of the footprint. The first and second side walls define between them a depressed region, in this case a trough, for picking up sealant to be applied to a moving web of shingle stock. In this embodiment, the trough has a curved shape instead of the flat shape of the groove of FIG. 3. In practice, the depressed region can be any desired shape as dictated by application specific demands.

A third upstanding wall 48 spans the trailing end of the trough and forms a backstop 56 at the trailing end. A fourth upstanding wall 49 spans the trough ahead of the wall 48 and forms a first mid-stop 57. The third and fourth upstanding walls define between them a rear trough section 54 in the trailing portion of the footprint. Similarly, a fifth upstanding wall 51 spans the trough ahead of the fourth upstanding wall 49 and defines a second mid-stop 58. The fourth and fifth upstanding walls 49 and 51 define between them an intermediate trough section 53. A forward trough section 52 is formed ahead of the fifth upstanding wall and terminates at the leading end of the footprint.

During operation of the sealant applicator wheel 17 at high speeds in high speed shingle manufacturing, each footprint 18 of FIG. 4 picks up a charge of sealant as previously described. Part of the charge is contained in the forward trough section 52, part is contained in the intermediate trough section 53, and part is contained in the rear trough section 54. As the sealant is carried around and up toward the moving shingle stock at high speed, the backstop 56 formed by the third upstanding wall 48 inhibits the sealant in the rear trough section 54 from being urged reawardly off the trailing end of the footprint 18. Similarly, the first mid-stop 57 contains the sealant in the intermediate trough section 53 and inhibits it from being urged rearwardly by the high speed rotation of the wheel. And, the second mid-stop 58 inhibits sealant in the forward trough section 52 from being urged rearwardly as the applicator wheel rotates.

This, in turn, helps to maintain an even distribution and consistent shape of the sealant charge along the length of the footprint. When the footprint contacts the moving shingle stock at the top of its travel, the more evenly distributed and more consistently shaped charge of sealant is transferred to the shingle stock. This forms a dash of sealant on the shingle stock that is more consistent, more fully formed, and that exhibits higher performance when shingles are ultimately installed on a roof deck. Further, the entire self-seal strip applied to the shingles is more uniform and bridging between sealant dashes caused by sealant in the gaps between footprints is greatly reduced or eliminated.

The invention has been described and exemplified herein in terms of preferred embodiments and methodologies considered by the inventor to represent the best modes of carrying out the invention. It will be understood, however, that a wide gamut of additions, deletions, and modifications, both subtle and gross, might well be made by skilled artisans without departing from the spirit and scope of the invention. The scope of the invention is not to be determined by the examples presented and described herein, but rather is delineated only by the claims hereof.

What is claimed is:

1. A method, comprising:

(a) moving a footprint of an applicator wheel through a supply of sealant to load the footprint with a charge of sealant;

wherein the footprint comprises a backstop positioned at a trailing end of the footprint;

(b) moving a web of shingle stock in a horizontal direction;

wherein the applicator wheel is configured to rotate along an axis perpendicular to the horizontal direction of the moving web of shingle stock;

wherein the web of shingle stock has a first surface and a second surface opposite the first surface;

(c) moving the footprint and the charge of sealant loaded into the footprint toward the first surface of the moving web of shingle stock;

(d) as the footprint and the charge of sealant move toward the first surface of the moving web of shingle stock, inhibiting the charge of sealant from being displaced from the trailing end of the footprint as a result of the movement of the footprint from the supply of sealant toward the first surface of the moving web of shingle stock with the backstop;

(e) transferring the charge of sealant from the footprint of the applicator wheel to the first surface of the moving web of shingle stock;

wherein during transfer of the charge of sealant to the first surface of the moving web of shingle stock from the footprint of the applicator wheel, areas of the second surface of the moving web of shingle stock directly opposite points of transfer between the footprint and the first surface of the moving web of shingle stock remain exposed to an external environment;

and (f) repeating steps (a) through (e) to apply a strip of sealant characterized by sealant dashes separated by spaces along the moving web of shingle stock.

2. The method of claim 1, the footprint comprises a trough configured to contain the charge of sealant extending between a leading end and the trailing end of the footprint; and wherein inhibiting the charge of sealant from being displaced from the trailing end of the footprint comprises intercepting movement of the charge of sealant out of the trough with the backstop.

3. The method of claim 1, further comprising forming at least one mid-stop on the footprint between a leading end of the footprint and the trailing end of the footprint.

4. The method of claim 3, wherein the footprint further comprises a trough extending from the leading end of the footprint to the backstop of the footprint and wherein inhibiting the charge of sealant from being displaced from the trailing end of the footprint comprises intercepting movement of a first portion of the charge of sealant with the mid-stop, and intercepting a second portion of the charge of sealant at the trailing end of the footprint with the backstop.

5. The method of claim 1, further comprising forming a plurality of footprints separated by gaps around a periphery of the applicator wheel.

6. The method of claim 1, wherein moving the footprint of the applicator wheel through a supply of sealant comprises rotating the applicator wheel about the axis so as to move the footprint along a path of travel through a reservoir positioned below the moving web of shingle stock and containing the supply of sealant and toward the moving web of shingle stock.

7. The method of claim 6, wherein transferring the charge of sealant comprises contacting the surface of the moving web of shingle stock with the footprint as the footprint is rotated to a substantially top point of the path of travel of the footprint and distributing the charge of sealant along the surface of the moving web of shingle stock as the footprint is rotated along the surface of the moving web of shingle stock.

8. The method of claim 1, wherein the supply of sealant is positioned opposite the moving web of shingle stock.

9. A method, comprising:

(a) moving an applicator wheel through a supply of sealant, wherein the applicator wheel includes at least one footprint comprising a backstop positioned at a trailing end thereof and configured to pick up a charge of sealant therein;

(b) moving a web of shingle stock in a horizontal direction;

wherein the applicator wheel is configured to rotate along an axis perpendicular to the horizontal direction of the moving web of shingle stock;

(c) loading the charge of sealant within the at least one footprint as the applicator wheel moves through the supply of sealant;

(d) moving the at least one footprint and the charge of sealant loaded therein toward the moving web of shingle stock;

(e) inhibiting, with the backstop, the charge of sealant within the at least one footprint from being displaced from the trailing end of the at least one footprint during movement of the at least one footprint from the supply of sealant toward the moving web of shingle stock;

(f) applying the charge of sealant to the moving web of shingle stock;

wherein applying the charge of sealant comprises contacting a surface of a first side of the moving web of shingle material with the at least one footprint and distributing the charges of sealant along the surface of the first side of the moving web of shingle stock;

wherein during application of the charge of sealant to the surface of the first side of the moving web of shingle stock by the at least one footprint of the applicator wheel, areas of a surface of a second side of the moving web of shingle stock directly opposite points of transfer between the at least one footprint and the surface of the first side of the moving web of shingle stock remain exposed to an external environment; and (g) repeating steps (a)-(f) to form a self-seal strip of sealant along the moving web of shingle stock.

10. The method of claim 9, wherein the at least one footprint comprises a trough, and wherein retaining the charge of sealant comprises intercepting movement of the charge of sealant from moving out of the trough of the at least one footprint with the backstop.

11. The method of claim 9, wherein the at least one footprint comprises at least one mid-stop positioned along the at least one footprint, and wherein loading the charge of sealant within the at least one footprint comprises picking-up a first portion of the charge of sealant in a forward section of the at least one footprint, and picking up a second portion of the charge of sealant in a rear section of the at least one footprint.

12. The method of claim 11, wherein inhibiting the charge of sealant comprises intercepting movement of the first portion of the charge of sealant along the forward section of the at least one footprint with the at least one mid-stop, and intercepting movement of the second portion of the charge of sealant along the rear section of the at least one footprint with the backstop.

13. The method of claim 9, wherein the applicator wheel comprises a plurality of footprints, each footprint comprising a trough with the backstop at a trailing end of the trough; and wherein applying the charge of sealant to the moving web of shingle stock to form a self-seal strip comprises transferring a plurality of charges of sealant from each of the plurality of footprints of the applicator wheel to the moving web of shingle stock, to form the self-seal strip having a plurality of sealant dashes separated by spaces.

14. The method of claim 9, wherein moving the applicator wheel through the supply of sealant comprises rotating the applicator wheel so as to move the at least one footprint through a reservoir positioned below the moving web of shingle stock and containing the supply of sealant.

15. The method of claim 14, wherein applying the charge of sealant comprises contacting a surface of the moving web of shingle stock with the at least one footprint and distributing the charge of sealant along the surface of the moving web of shingle stock with the rotation of the applicator wheel.

16. A method, comprising:

(a) moving an applicator wheel through a supply of sealant, wherein the applicator wheel includes a plurality of footprints, each footprint comprising a trough and a backstop at a trailing end of thereof;

(b) moving a web of shingle stock in a horizontal direction;

wherein the applicator wheel is configured to rotate along an axis perpendicular to the horizontal direction of the moving web of shingle stock;

(c) loading a charge of sealant within the trough of each of the plurality of footprints as the applicator wheel moves through the supply of sealant;

(d) moving the plurality of footprints with the charges of sealant loaded therein toward a moving web of shingle stock;

(e) as the plurality of footprints are moved toward the moving web of shingle stock, inhibiting the charges of sealant from being displaced from the trailing ends of each of the plurality footprints with the backstop; and (f) transferring the charges of sealant from the plurality of footprints to the moving web of shingle stock to form a self-seal strip comprising a plurality of dashes of sealant separated by spaces along the moving web of shingle stock;

wherein transferring the charges of sealant comprises contacting a surface of a first side of the moving web of shingle material with the footprints and distributing the charges of sealant along the surface of the first side of the moving web of shingle stock;

wherein during transfer of the charge of sealant to the surface of the first side of the moving web of shingle stock by the footprints of the applicator wheel, areas of a surface of a second side of the moving web of shingle stock directly opposite points of transfer between the footprints and the surface of the first side of the moving web of shingle stock remain exposed to an external environment.

17. The method of claim 16, wherein each of the plurality of footprints further comprises at least one mid-stop positioned along the trough thereof, and wherein loading the charge of sealant within each of the plurality of footprints comprises picking-up a first portion of the charge of sealant in a forward section of the trough of each of the plurality of footprints, and picking up a second portion of the charge of sealant in a rear section of the trough of each of the plurality of footprints.

18. The method of claim 17, wherein inhibiting movement of the charge of sealant from being displaced from each of the plurality of footprints comprises intercepting movement of the first portion of the charge of sealant rearwardly along each footprint with the at least one mid-stop, and intercepting movement of the second portion of the charge of sealant off of the trailing end of each footprint with the backstop.

19. The method of claim 16, wherein each of the plurality of footprints further comprises a first mid-stop positioned along the trough, a second mid-stop positioned along the trough and spaced from the first mid-stop; wherein a forward trough section is defined forwardly of the first mid-stop, an intermediate trough section is defined between the second mid-stop and the first mid-stop, and a third trough section is defined between the second mid-stop and the backstop; and wherein loading the charge of sealant within each of the plurality of footprints comprises picking up a first portion of the charge of sealant in the forward trough section, picking up a second portion of the charge of sealant in the intermediate trough section, and picking up a third portion of the charge of sealant in the third trough section.

20. The method of claim 16, wherein transferring the charges of sealant from the plurality of footprints comprises rotating the applicator wheel through a reservoir positioned below the moving web of shingle stock and containing the supply of sealant and toward contact with the surface of the moving web of shingle stock and distributing the charges of sealant along the surface of the moving web of shingle stock.

21. The method of claim 16, wherein the supply of sealant comprises a reservoir located below the moving web of shingle stock and containing a liquid sealant; and wherein loading the charges of sealant within the trough of each footprint comprises rotating the applicator wheel through the liquid sealant and picking up the charges of sealant within the plurality of footprints.

* * * * *